(12) United States Patent
Osborne

(10) Patent No.: US 6,877,052 B1
(45) Date of Patent: Apr. 5, 2005

(54) SYSTEM AND METHOD FOR IMPROVED HALF-DUPLEX BUS PERFORMANCE

(75) Inventor: Randy B. Osborne, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 433 days.

(21) Appl. No.: 09/675,991

(22) Filed: Sep. 29, 2000

(51) Int. Cl.$^7$ .............................................. G06F 13/00
(52) U.S. Cl. ..................... 710/107; 710/105; 710/240; 710/241; 710/52
(58) Field of Search ................................ 710/105, 107, 710/240, 241, 52, 100, 112, 113, 119, 40, 108, 114, 33, 200; 709/233, 103; 713/502

(56) References Cited

U.S. PATENT DOCUMENTS

| | | | | |
|---|---|---|---|---|
| 3,825,902 A | * | 7/1974 | Brown et al. ................ | 710/264 |
| 4,574,350 A | * | 3/1986 | Starr .......................... | 710/200 |
| 4,602,327 A | * | 7/1986 | LaViolette et al. ......... | 710/107 |
| 5,129,090 A | * | 7/1992 | Bland et al. ................. | 710/114 |
| 5,276,681 A | * | 1/1994 | Tobagi et al. ............... | 370/229 |
| 5,392,404 A | * | 2/1995 | Thompson ................... | 710/40 |
| 5,440,691 A | * | 8/1995 | Carrafiello et al. .......... | 709/234 |
| 5,448,701 A | * | 9/1995 | Metz et al. .................. | 710/113 |
| 5,546,543 A | * | 8/1996 | Yang et al. .................. | 709/235 |
| 5,682,508 A | | 10/1997 | Hocker, III | |
| 5,771,356 A | * | 6/1998 | Leger et al. ................. | 709/233 |
| 5,787,264 A | | 7/1998 | Christiansen et al. | |
| 5,859,990 A | * | 1/1999 | Yarch .......................... | 710/33 |
| 5,872,936 A | | 2/1999 | Eckstein | |
| 5,898,694 A | * | 4/1999 | Ilyadis et al. ............... | 370/462 |
| 5,915,101 A | | 6/1999 | Kleineberg et al. | |
| 6,016,528 A | | 1/2000 | Jaramillo et al. | |
| 6,021,455 A | * | 2/2000 | Kondo et al. ................ | 710/241 |
| 6,105,094 A | | 8/2000 | Lindeman | |
| 6,145,039 A | | 11/2000 | Ajanovic et al. | |
| 6,151,651 A | | 11/2000 | Hewitt et al. | |
| 6,223,238 B1 | | 4/2001 | Meyer et al. | |
| 6,256,697 B1 | | 7/2001 | Ajanovic et al. | |
| 6,347,351 B1 | | 2/2002 | Osborne et al. | |
| 6,393,505 B1 | | 5/2002 | Scalise et al. | |
| 6,393,506 B1 | * | 5/2002 | Kenny ......................... | 710/113 |
| 6,418,538 B1 | * | 7/2002 | Garney et al. ............... | 713/502 |
| 6,473,780 B1 | * | 10/2002 | Barcelo ....................... | 709/103 |

FOREIGN PATENT DOCUMENTS

| | | |
|---|---|---|
| DE | 44 26 123 A1 | 2/1996 |
| EP | 0 552 507 A1 | 7/1993 |

OTHER PUBLICATIONS

Jack Sykes, "Analytical Model of Half–Duplex Interconnections of Computers", 1969, IEEE, IEEE Transactions on Communication Technology, vol. COM–17, No. 2, pp 235–238.*

Satoshi Fujita, "Brief Contributions, A Fault–Tolerant Broadcast Scheme in the Star Graph under the Single–Port Half–Duplex Communication Model", 1999, IEEE, IEEE Transactions on Computers, vol. 48, No. 10, pp 11231126.*

U.S. Appl. No. 09/591,928, filed Jun. 16, 2000 (21 pages, including cover, 11 sheets of drawings, including 11 Figures); Entitled: Method and Apparatus for Single Wire Signalling of Request Types in a Computer System Having a Point to Point Half Duplex Interconnect, Randy B. Osborne and David J. Harriman.

* cited by examiner

Primary Examiner—Mark H. Rinehart
Assistant Examiner—Justin I. King
(74) Attorney, Agent, or Firm—Blakely, Sokoloff, Taylor & Zafman LLP

(57) ABSTRACT

A method for dynamic preemption of read returns over a half-duplex bus during heavy loading conditions involves asserting a preempt signal by a first agent to indicate that the first agent has a read request pending for transmission over the half-duplex bus. A second agent then samples the preempt signal sent by the first agent. The second agent relinquishes ownership of the half-duplex bus responsive to the preempt signal to allow the read request to be sent across the half-duplex bus.

24 Claims, 2 Drawing Sheets

SYSTEM AND METHOD FOR IMPROVED HALF-DUPLEX BUS PERFORMANCE

RELATED APPLICATION

The present application is related to Ser. No. 09/433,653 filed Nov. 3, 1999 entitled, "METHOD AND APPARATUS FOR SUPPORTING MULTI-CLOCK PROPAGATION IN A COMPUTER SYSTEM HAVING POINT-TO-POINT HALF DUPLEX INTERCONNECT", which application is assigned to the assignee of the present application.

FIELD OF THE INVENTION

The present invention relates generally to the field of computer systems; more particularly, to methods and apparatus for efficient transfer of data and information between devices or agents coupled to a bus, data link, or other type of input/output (I/O) interconnect.

BACKGROUND OF THE INVENTION

Manufacturers of semiconductor devices face constant pressure to reduce the number of interconnects, especially in chipset platforms comprising multiple semiconductor devices interconnected on a common printed circuit board. Since the number of pins is a major factor in the costs of inter-chip connections, it is desirable to make such interconnects fast and narrow. This has led to the development of devices having fewer pins, and pins that can transmit signals very quickly.

One proposal addressing this problem is to utilize a half-duplex bus with distributed arbitration for I/O interconnects designed to connect I/O hubs and peripheral component interface (PCI) bridges (e.g., south bridges) to the memory hub controller (e.g., north bridge). It is well known that in a full-duplex bus, traffic can flow bi-directionally, simultaneously across separate sets of wires. A half-duplex bus is one in which there is a single lane of traffic (i.e., one set of wires) that is shared according to some sort of time-multiplexing scheme. A useful analogy is to think of a half-duplex bus as a single-lane bridge spanning across a river or chasm. Flagman positioned at each end signal to the other side to request ownership or use of the bridge in order to allow traffic to traverse in one direction or the other.

A common method to achieve synchronization on a half-duplex bus is via a global clock, also frequently referred to as a common or base clock. Each agent coupled to the bus usually has its own associated request signal line (REQ) used to gain ownership of the bus. Since traffic flow over the bus is always unidirectional, only one side of the bus has ownership of the bus at any given time. Each agent executes the same arbitration algorithm; asserting its request signal to convey its request to a remote agent; sampling the request signal driven by the remote agent; and then choosing which agent to grant ownership to based on the local and remote requests. Thus, in a half-duplex bus link, both ends contend for the shared bus resource.

In a typical I/O environment in which a half duplex a bus is deployed, one end of the link usually connects to a memory controller. The vast majority of traffic comprises memory reads and writes generated by devices connected to the I/O bridge and targeting the memory coupled to the memory controller. In such a system, three types of requests normally contend for ownership of the link: (1) write transfers (address plus data) upstream to the memory controller; (2) read requests (address plus size); and (3) read returns (address plus data) downstream to the requesting agent.

Data writes and read returns are very similar in that the both have a long latency and both are unidirectional "fire and forget" transfers. But a memory read operation is quite different. A successful memory read operation requires a complete round-trip over the bridge; that is, a read request must first travel upstream to the memory controller, where the request is serviced, followed by a return of the read data downstream back to the requesting agent.

The rate of read returns is often limited by the rate at which read requests travel upstream. Under heavy loading conditions, particularly involving many downstream read returns, there can be a long delay before traffic flow across the link is turned around to permit an upstream read request. If the latency period is too long, the memory controller will run out of pending requests, and thus experience a momentary break in the pipelining of read returns. Failure to allow a read request upstream in a timely manner can therefore result in a "bubble" in the read return traffic, with a corresponding reduction in read bandwidth.

Accordingly, what is needed is a method or protocol that permits more efficient utilization of the half-duplex bus resource.

BRIEF DESCRIPTION OF THE DRAWINGS

The present invention will be understood more fully from the detailed description which follows and from the accompanying drawings, which however, should not be taken to limit the invention to the specific embodiments shown, but are for explanation and understanding only.

DETAILED DESCRIPTION

An system and method for improved half-duplex bus performance under heavy loading is described. In the following description, numerous details are set forth, such as specific system configurations, algorithms, signal lines, etc., in order to provide a thorough understanding of the invention. It will be clear, however, to one skilled in the art, that these specific details may not be needed to practice the present invention.

Figure 1:
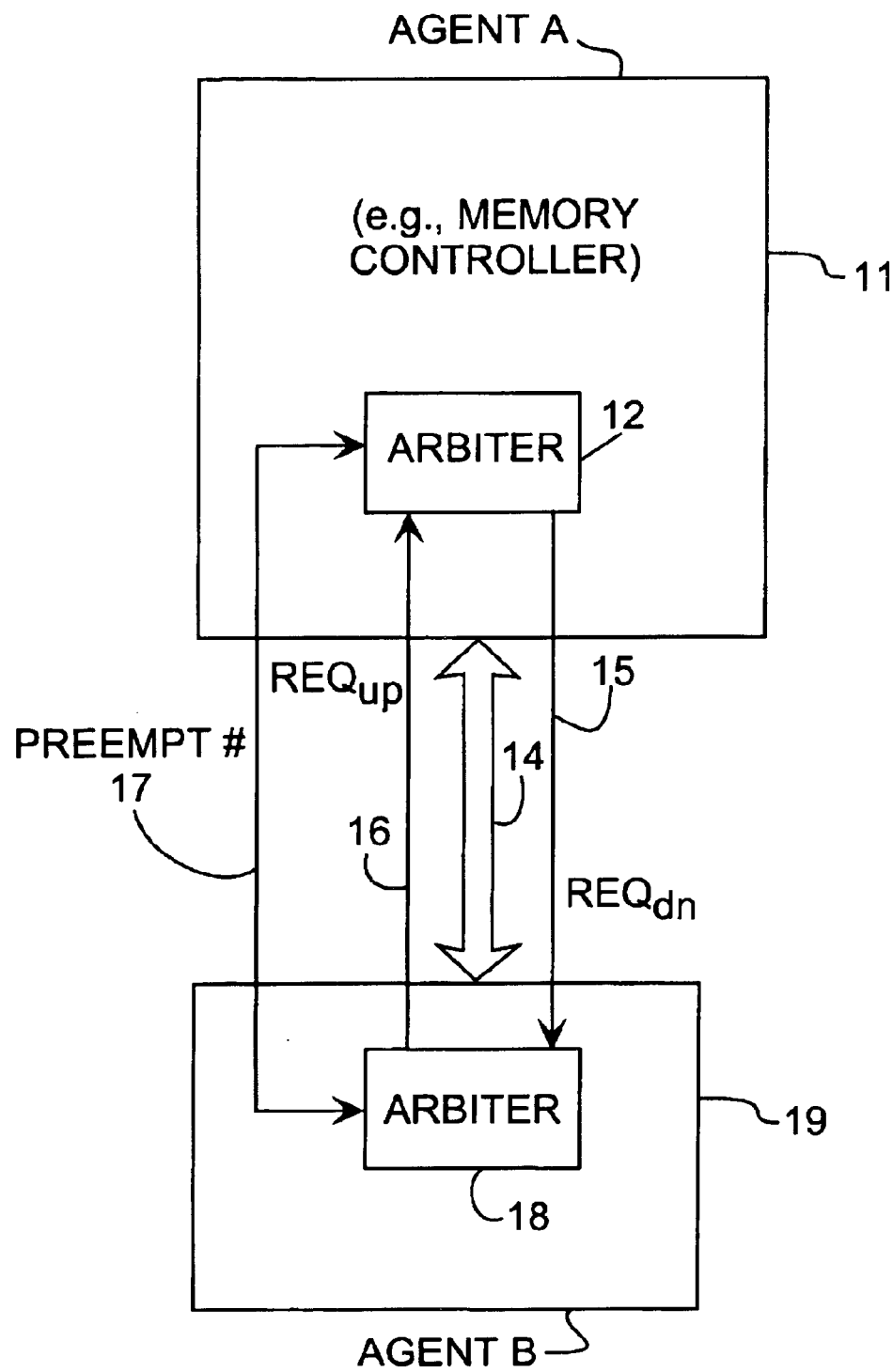
FIG. 1 is a diagram of an interconnect system in which agents communicate information over a shared bus in accordance with one embodiment of the present invention.

With reference to FIG. 1, there is shown an interconnect system comprising a pair of bus agents 11 and 19 (agents "A" & "B", respectively) coupled to a common bus 14. (Numeral 14 is used to denote the actual signal lines or wires used to transfer data between two agents. However, it should be understood that the term "bus" is sometimes used by practitioners to collectively denote lines 14–17; that is, all of the lines connecting the respective agents. In the context of the present discussion, each of these lines is referred to separately.) Each agent coupled to the bus executes exactly the same distributed arbitration algorithm. For example, in one embodiment, bus 14 may comprise a half-duplex bus with distributed arbitration. Each agent includes an arbiter that operates in accordance with a predetermined arbitration algorithm. In FIG. 1, agent 11 includes an associated arbiter 12, and agent 19 includes an associated arbiter 18. In a typical system configuration, agent 11 may comprise a memory controller coupled to a main or cache memory, and agent 19 may comprise an I/O bridge device.

Both agents are also coupled via associated request signal lines 15 and 16. Both agents monitor these request signal lines to determine if a request signal from a remote agent has arrived. The request signals are used by the agents to gain ownership of the bus for transmission of data and information. In FIG. 1 an upstream request ($REQ_{up}$) is made by agent 19 to gain ownership of bus 14 for a transfer of information in a direction from agent 19 to agent 11. Likewise, a downstream request ($REQ_{dn}$) is made by agent 11 to gain ownership of bus 14 for a transfer of information in a direction from agent 11 to agent 19. By way of example, agent 19 (e.g., an I/O bridge) asserts line 16 prior to sending a read request across half-duplex bus 14 to agent 11 (e.g., a memory controller). In the same manner, agent 11 would assert line 15 prior to sending data of a read return back to requesting agent 19.

Operations on bus 14 are synchronized by a common or global clock signal, i.e., GCLK, (not shown).

In accordance with one embodiment of the present invention, a preempt signal line 17 is connected between the arbitration units 12 and 18 of the two agents. (It is appreciated that the "#" symbol denotes that the preempt signal is asserted when the voltage potential or logic level of the line is low.) Preempt signal 17 is utilized in the present invention as a way for the downstream end to convey the presence of a pending read request to the upstream end. As will be described in more detail shortly, preempt signal 17 provides a way for the distributed arbiters of the upstream and downstream ends to synchronize and dynamically preempt a read return.

Under heavy loading conditions the arbiters operate according to a protocol that improves efficiency by minimizing bus turnarounds, while at the same time ensuring that enough read requests get transferred upstream in a timely manner to avoid read starvation and the resultant loss in read bandwidth. The preempt signal 17 implements the idea of a "time-slice", wherein bus traffic from the upstream to the downstream end of the bus bridge is occasionally interrupted to allow read requests to cross the bridge, thereby ensuring that the bus does not go idle due to read starvation.

The present invention is not limited to a time-slice of a particular duration. In other words, the time-slice can vary depending on system considerations. For example, the preempt signal may be used to implement a time-slice which immediately interrupts traffic flow over the bus bridge to allow a read request across the bus in the opposite direction as soon as it appears at one end of the bus. This example represents an extreme case, since granting read requests in this manner would produce a large number of bus turnarounds, i.e., reversing the direction of bus traffic, which would result in an inefficient utilization of the bus resource. At the other extreme, is the case where the time slice is intentionally made very long. But the problem with making the time slice too long is that it leads to the starvation problem previously discussed. That is, if the time slice is very large, there is a risk that the bridge will become idle due to not enough pending read requests being serviced by the memory controller for downstream return across the bus bridge. Therefore, the present invention achieves optimized utilization of the bus by a preemption algorithm that balances the foregoing concerns for a particular system application.

Note that if only memory writes were transmitted from both directions it would make sense to make the time-slice the very long since writes are not sensitive to latency and they are not round-trip transactions.

The preempt signal provides the arbiter associated with the agent at one end of the bus with additional information regarding the request type pending at the opposite end. In the example of FIG. 1, preempt signal 17 is asserted by agent 19 when it has a read request waiting to be sent over the bus bridge. Arbiter 12 associated with agent 11 can respond to preempt signal 17 in a number of different ways, depending on the particular preemption algorithm being implemented. For instance, arbiter 12 may determine that the number of requests pending is below a certain number, warranting that it relinquish its current ownership of the bus to the remote agent. The key concept is that the preemption signal provides information to a remote agent regarding a pending read request at the opposite end of the unidirectional bus. Depending on the number of requests the remote agent is currently servicing or that it has queued for delivery downstream across the bus, that agent can decide to interrupt the stream of downstream traffic going over the bus.

A wired-OR signal connection, or its equivalent, is one possible way of identifying a pending request at the downstream end as a read request for which preemption is to occur. To determine if the starvation may occur, the upstream end examines the queue of read requests sent from the downstream end that is awaiting service by the memory controller. If the queue is below the predetermined threshold, e.g., empty, then read starvation may occur. In response, the upstream arbiter can elect a suitable point at which to preempt the read return, e.g., at a cacheline boundary. To synchronize the downstream arbiter to the same preemption point, the upstream arbiter removes (i.e., de-asserts) its request signal. Upon observing the upstream end's request signal being de-asserted, the downstream arbiter considers the read return terminated and agrees to turnaround the direction of traffic flow on the bus.

It should be understood that the preemption mechanism may comprise more than a single wire or signal. The specific way that the preemption mechanism is implemented is not essential to the present invention. Rather, the important concept involves the use of the preemption mechanism to signal the type of request that is pending at the opposite end of the link for the purpose of solving the problem of read starvation.

To recapitulate, the preempt signal is asserted when there are a certain number of read requests queued up at one end of the bus bridge (assuming that the agent at that end does not presently have ownership of the bus). The preempt signal is asserted to notify the remote agent at the other end of the bus (via the preemption algorithm) that there are a number of read requests pending to be sent across the bus in the opposite direction. The upstream agent receiving the preempt signal examines the traffic loading at its end in determine whether it is appropriate to relinquish ownership of the bus to allow a number of read requests across the bus in the opposite direction to avoid read starvation. After a number of read requests have been sent across the bus in the upstream direction, the upstream agent may then request ownership of the bus to once again send read return data downstream to the remote agent.

Note that the control algorithm may vary; for example, the downstream agent can make its own decision about what type of traffic to send over the bus after it asserts the preemption signal. Likewise, the downstream agent may decide to only allow a certain number of read requests to cross the bridge following the preemption request. For example, the downstream end may try to make the time-slice long by sending over all of its pending read requests along with several writes in order to amortize the turnaround penalty. It is appreciated that this is simply an implementation detail that may be parameterized utilizing an ordinary time-slice counter. For instance a certain number of clocks may be loaded into the counter to set the duration of time-slice.

Figure 2:
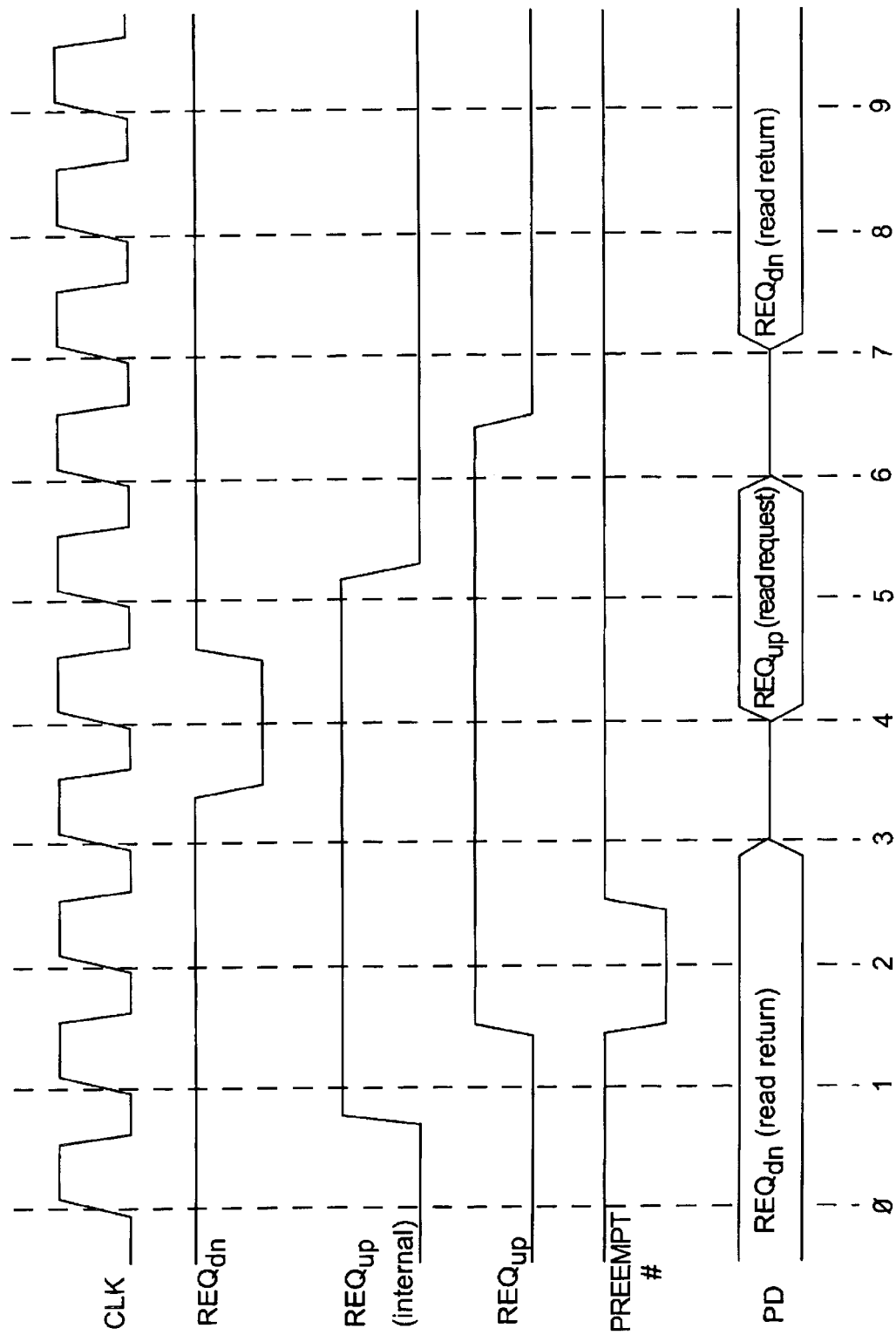
FIG. 2 is a timing diagram showing signal transmission across a half-duplex bus in accordance with one embodiment of the present invention.

FIG. 2 is an exemplary timing diagram that illustrates how the downstream agent may preempt the upstream agent's return of read data. In the example of FIG. 2, the preempt signal is a unidirectional signal having a direction opposite to the direction data is currently flowing across the bus. For example, if traffic is flowing from agent "A" to agent "B", the preempt signal is only allowed in the opposite direction; namely, from agent "B" to agent "A". In this example, there is a one clock delay before the preempt signal can be asserted following a turnaround of data flow across the bus.

Viewing FIG. 2 in conjunction with FIG. 1, it can be seen that the internal logic of arbiter 18 first recognizes that it has a read request to be sent upstream between clock edges $CLK_0$ and $CLK_1$. At clock edge $CLK_0$ agent 11 has ownership of bus 14 and is sending read return data downstream to agent 19 via bus wires PD. This is evident by the high level of $REQ_{dn}$ and the presence of read return data on wires PD in FIG. 2. In the following clock period, between clock edges $CLK_1$ and $CLK_2$, the $REQ_{dn}$ signal is asserted by raising signal line 16 to a logical high level. In the same clock period PREEMPT# is asserted low by agent 19 to notify agent 11 that it has a pending read request. In this case, the high-to-low transition of PREEMPT# is triggered by sampling both $REQ_{dn}$ and $REQ_{up(internal)}$ high at the rising edge of $CLK_1$.

Agent 11 samples $REQ_{up}$ and PREEMPT# at the rising edge of $CLK_2$. In response, arbiter 12 de-asserts $REQ_{dn}$ and terminates read return traffic flow to initiate a turnaround in the direction of traffic flow on bus 14. The turnaround occurs between clock edges $CLK_3$ and $CLK_4$. As explained earlier, the particular preemption algorithm being implemented by arbiter 12 determines the exact time when the upstream end relinquishes ownership of the bus.

At clock edge $CLK_4$ the downstream end (agent 19) gains ownership of the bus and begins transmitting its read request to the upstream end over the PD signal lines. Arbiter 18 grants ownership of the bus back to the upstream end between clock edges $CLK_6$ and $CLK_7$ by de-asserting $REQ_{up}$, whereupon the upstream end (agent 11) once again begins sending read return data across bus 14 commencing at $CLK_6$. (Note that the downstream agent sampled $REQ_{dn}$ high at the rising edge of $CLK_4$.)

It should be appreciated that the preempt signal could be implemented in any one of a number of different ways. In one embodiment, the preempt signal could be implemented as a single wire that is always owned by the downstream agent. In another embodiment, the signal may be implemented to allow for two-way preemption; e.g., where agent "A" may preempt agent "B" and vice-versa. The illustrations of FIGS. 1 and 2 should therefore not be considered to limit the scope of the present invention.

I claim:

1. A method comprising:
   transferring read data from a first agent, the first agent being coupled to a half-duplex bus;
   issuing a preempt signal from a second agent, the second agent being coupled to the half-duplex bus;
   determining whether to allow preemption of the read data based at least in part on a number of read requests that are pending for the first agent; and
   if preemption is allowed:
   determining a suitable point to preempt the read data transfer;
   temporarily halting the read data transfer,
   transferring a read data request from the second agent to the first agent, and
   resuming the read data transfer.

2. The method of claim 1, wherein the first agent comprises a memory controller.

3. The method of claim 2, wherein the second agent comprises an input/output device.

4. The method of claim 1, wherein determining whether to allow preemption of the read data comprises determining if the number of pending read requests for the first agent is below a threshold.

5. The method of claim 1, wherein determining a suitable point to preempt the read data transfer comprises identifying a cacheline boundary.

6. The method of claim 1, further comprising allowing transfer of a limited number of read requests before resuming the read data transfer.

7. A method comprising:
   transferring read data over a half-duplex bus from a memory controller;
   issuing a first signal indicating that an I/O device has a read request pending;
   issuing a second signal requesting preemption of the transfer of read data;
   if a number of read requests held by the memory controller is below a threshold:
   electing a suitable point for preemption of the transfer of read data, pausing transmission of read data;
   providing control of the half-duplex bus to the I/O device,
   transferring the read request from the I/O device to the memory controller over the half-duplex bus,
   providing control of the half-duplex bus to the memory controller, and resuming transfer of read data.

8. The method of claim 7, further comprising sampling the first signal and the second signal.

9. The method of claim 7, wherein the threshold is an indicator of imminent read starvation.

10. The method of claim 7, wherein the suitable point for preemption of the transfer of read data comprises a cacheline boundary.

11. The method of claim 7, wherein a transition period from pausing transfer of read data to transferring the read request is one clock period.

12. The method of claim 11, wherein a transition period from transferring the read request to resuming transfer of the read data is one clock period.

13. The method of claim 7, wherein the memory controller includes an arbiter that executes an arbitration protocol.

14. The method of claim 7, wherein the arbiter of the memory controller executes a preemption algorithm to elect the suitable point for preemption.

15. A computer system comprising:
   a half duplex bus;
   a first agent and a second agent, the first agent and the second agent each being coupled to the half-duplex bus, the first agent and the second agent each comprising an arbiter that follows an algorithm to determine ownership of the half-duplex bus;
   a request line coupled between the first and second agents, the request line being asserted by the second agent to request ownership of the half-duplex bus from the first agent; and
   a preempt line, a preempt signal being asserted by the second agent on the preempt line to request temporary preemption of data transfer by the first agent to allow transmission of a read request, the first agent to allow preemption if a number of pending read requests for the first agent is less than a threshold, the first agent to determine a suitable point for preemption of data transfer.

16. The computer system of claim 15, wherein the second agent asserts the preempt signal during a current read return from the first agent.

17. The computer system of claim 15, wherein the suitable point comprises a cacheline boundary.

18. The computer system of claim 15, wherein the first agent comprises a memory controller.

19. The computer system of claim 18, wherein the second agent comprises an input/output (I/O) device.

20. A computer system comprising:
   means for transferring read data by a first agent, the first agent being coupled to a half-duplex bus;
   means for transferring a preemption signal from a second agent to the first agent, the second agent being coupled to the half-duplex bus;
   means for determining whether to grant preemption based on a number of pending read requests for the first agent;
   means for determining an appropriate point for preemption;
   means for temporarily suspending the transference of read data in response to the preemption signal;
   means for transferring a read request from the second agent to the first agent after suspension of the transference of read data; and
   means for resuming transference of read data after transference of the read request.

21. The computer system of claim 20, wherein the first agent comprises a memory controller.

22. The computer system of claim 20, wherein the second agent comprises an input/output device.

23. The computer system of claim 20, wherein the means for determining whether to grant preemption comprises means for determining whether the number of pending read requests for the first agent is below a threshold.

24. The computer system of claim 20, wherein means for determining an appropriate point for preemption comprise means for identifying a cacheline boundary.

* * * * *

UNITED STATES PATENT AND TRADEMARK OFFICE
CERTIFICATE OF CORRECTION

PATENT NO. : 6,877,052 B1  Page 1 of 1
DATED : April 5, 2005
INVENTOR(S) : Osborne It is certified that error appears in the above-identified patent and that said Letters Patent is hereby corrected as shown below:

<u>Column 5,</u>
Line 22, delete "REQ $_{dn}$" and insert -- REQ $_{up}$ --.

Signed and Sealed this

Twenty-eighth Day of June, 2005

JON W. DUDAS
*Director of the United States Patent and Trademark Office*